May 19, 1925.  
H. B. TAYLOR  
FLUID OPERATED HEAD INCREASER  
Filed June 23, 1920  
1,538,069  
2 Sheets-Sheet 2

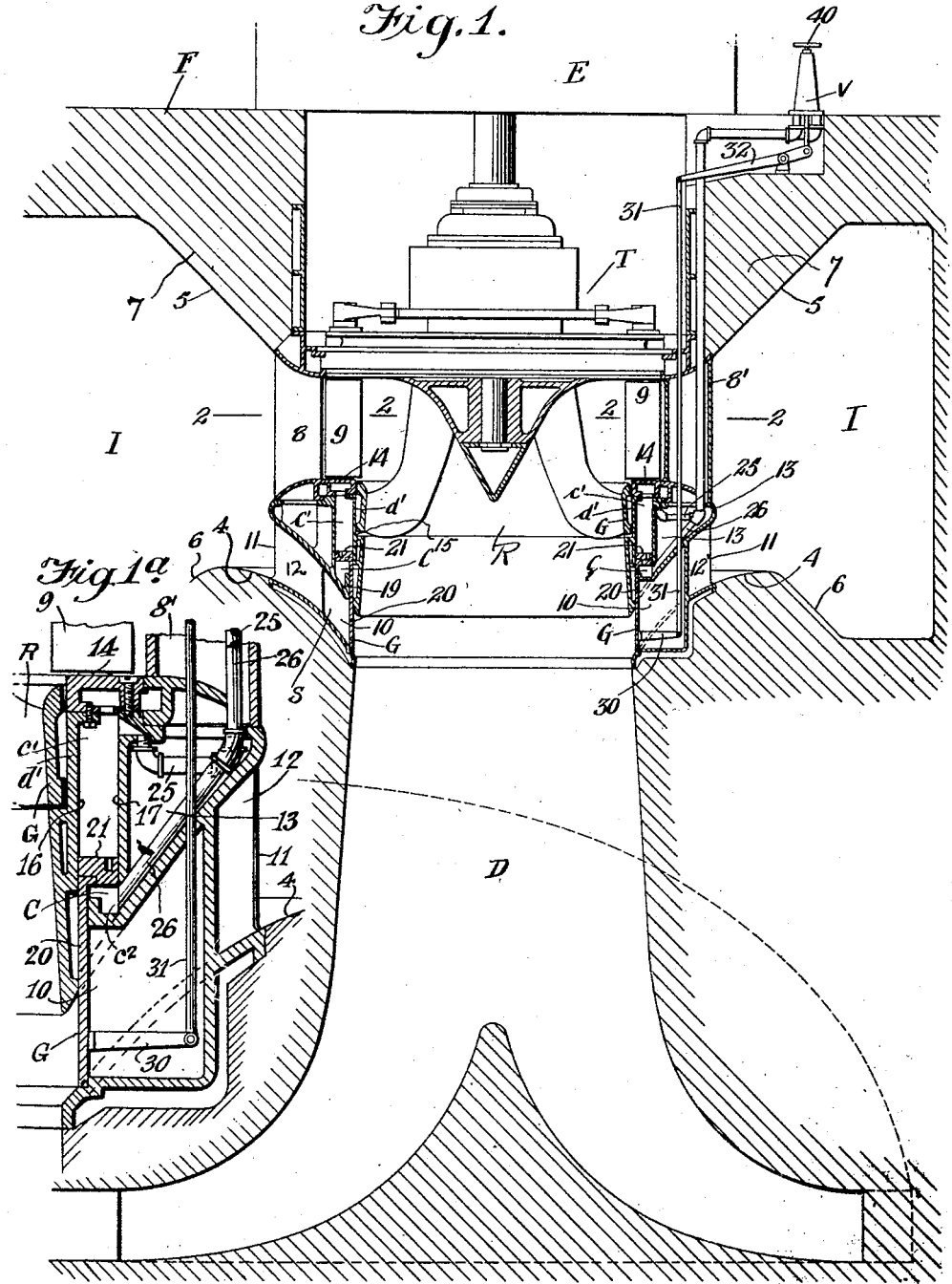

INVENTOR.  
Harvey Bachard Taylor  
BY his ATTORNEYS,  
Edwards, Sager & Bower

Patented May 19, 1925.

1,538,069

UNITED STATES PATENT OFFICE.

HARVEY BIRCHARD TAYLOR, OF PHILADELPHIA, PENNSYLVANIA.

FLUID-OPERATED HEAD INCREASER.

Application filed June 23, 1920. Serial No. 391,036.

*To all whom it may concern:*

Be it known that I, HARVEY BIRCHARD TAYLOR, a citizen of the United States, residing at Philadelphia, in the county of Philadelphia and State of Pennsylvania, have invented certain new and useful Improvements in Fluid-Operated Head Increasers, of which the following is a specification.

This invention relates to hydraulic power plants and particularly to means for increasing the effective head on the turbine runner. The effective head is the difference between the initial head at entrance and the absolute pressure head against which the runner discharges. This difference may be increased by opening an auxiliary gate in the wall of the draft tube below the runner and thereby admitting auxiliary water under the initial head on the plant. This auxiliary water entering and passing through the draft tube at high velocity entrains the runner discharge and accelerates it and has the effect of an ejector, reducing the absolute pressure against which the runner discharges, and thus increasing the effective head under which the runner is operating. This means of increasing the head is particularly useful in plants subject to considerable reductions of the head during highwater conditions due to abnormal height of water in the tailrace, a condition which is very common in low head plants. In order, however, that the method of maintaining or increasing the head on a runner just outlined may be economically applied, it is essential that the necessary modifications in the turbine structure and the additional mechanism which must be provided should be sufficiently inexpensive to avoid any undue increase in the cost per horse power of the development. The additional horse power obtainable by a device of this kind must be secured without a disproportionate increase in the cost of the installation, or otherwise the adoption of a head increaser would be a doubtful economy.

The object of the present invention is to avoid complicated and expensive mechanisms for operating the gate of a head increaser and to provide simple fluid operated mechanism therefor compactly housed within the contour of the turbine parts and controlled through piping from the power house floor above.

In the accompanying drawings illustrating a specific embodiment of the invention, Fig. 1 is a vertical sectional view through a turbine on line 1, 1 of Fig. 2;

Fig. 1ª is an enlarged view of a portion of Fig. 1;

Figure 3:
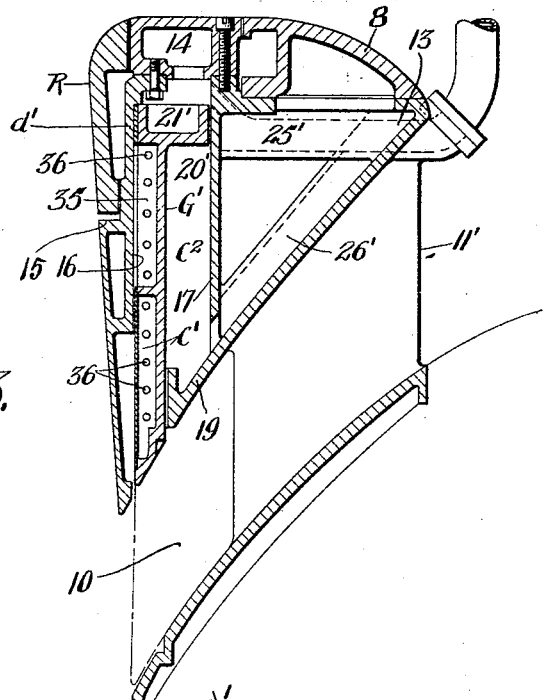
Fig. 3 is a vertical sectional view of a modified detail on enlarged scale.

In the embodiment of the invention illustrated in the drawings, a vertical shaft turbine T drives the generator E on the floor F of the power house and has its runner R receiving the flow from intake I and discharging it into draft tube D which is of the spreading type adapted to recover the energy of both the axial and whirling components of velocity.

The intake I is of volute form wrapping around the guide vane passages to the runner R and of constantly narrowing cross section in the direction of flow and the upper and lower circular walls 5 and 6 of this volute are inclined toward the runner passages and form in the power house substructure the oppositely facing frusto-conical portions 7 and 4 between which are the speed ring 8 and adjustable guide vanes 9 guiding and controlling the flow to the runner. Through lower conical portion 4, the passage 10 forms a by-pass to conduct water directly from the intake volute I to the draft tube D at a point somewhat below the discharge edge of the runner R without passing the flow through the runner.

This auxiliary pass or by-pass 10 is circular in form extending around the draft tube and is curved to turn its flow nearly axially in the direction of the draft tube. A stay vane ring casting 11 having vanes 12 provides the surfaces of the by-pass walls and supports the structure above. The top portion of the ring 11 is formed as a casing of generally triangular shape in vertical sectional view and the upper portion of the casing is formed to fit and support the lower surface of the speed ring 8 and the wear ring 14 upon which bear the adjustable guide vanes 9 (see Fig. 1ª).

Depending from the ring 14 and bolted thereto is the tubular section *d'* extending around the shroud ring G of the runner R and also continuing at its lower portion below said shroud ring so as to form the upper end of the draft tube D and stepped at 15 to form an annular recess for the lower portion of the runner R. The outer surface 16 of the draft tube section $d'$ is spaced from the inner wall 17 of the upper portion 13 of stay vane ring 11 so that a circular chamber C is provided closed at the top by ring 14 and at the bottom by a portion of ring 11 forming the top wall 19 of the by-pass 10.

Within the chamber C slides the gate G comprising a cylindrical ring 20 carrying the annular piston 21 fitted within chamber C and dividing the chamber into an upper or closing end $c'$ and a lower or opening end $c^2$. The cylinder 20 is guided between the surfaces of the rings 11 and $d'$ and in its lowermost position (Fig. 1) closes by-pass 10 and may be moved upward to any desired extent to provide a corresponding opening through the by-pass. In Fig. 3 the gate G is shown divided vertically into sections for instance semi-circles with their ends flanged as at 35 and bolted together by bolts 36, this division being resorted to with gates of excessively large diameter.

The movement and position of the gate G are controlled by fluid pressure in ends $c'$, $c^2$ of chamber C, a pipe 25 connected to end $c'$ and a pipe 26 to the end $c^2$ and both pipes extending to the power house floor to have their fluid pressure or exhaust controlled by the valve means V accessible on said floor. To open the auxiliary pass gate G pressure is admitted to end $c^2$ of chamber C through pipe 26 and simultaneously pressure is exhausted from end $c'$ by pipe 25. To close the gate the pressure is admitted through pipe 25 and exhausted through pipe 26.

Figure 2:
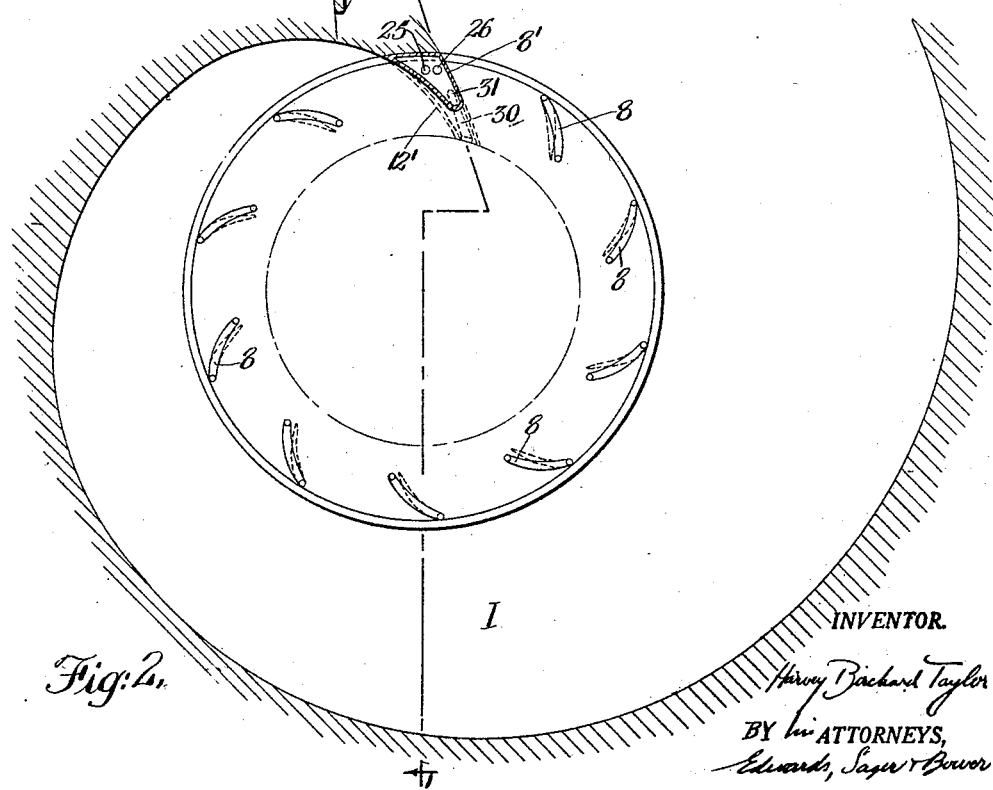
Fig. 2 is a horizontal section on line 2, 2 of Fig. 1.

In Figs. 1 and 2 these pipes 25 and 26 are illustrated as passing through the hollow baffle vane 8' of the intake and auxiliary pass respectively while Fig. 3 illustrates a modification in which these pipes are carried down outside of this baffle and are connected to the ends of the operating cylinder through integral passages 25' and 26' in the stay vane ring casting 11'. To indicate the position of the gate G and aid the control means to maintain the desired adjustment, a restoring connection may be provided by arm 30 on the gate moving the vertical rod 31 connected by lever 32 to the control, the rod 31 preferably passing up through the intake and auxiliary pass baffles and the arm 30 moving in a vertical recess formed between the extended sides of the auxiliary pass stay vane ring baffle 12' as shown.

The stay vanes 12 are inclined in the direction of the flow and are preferably not extended all the way through the ring 11 but are confined to the outer portion thereof in vertical line with the vanes of speed ring 8. This saves in metal and leaves an annular space S in which the whirling streams may consolidate before entering the discharge in the draft tube D. Due to the spreading character of the draft tube and its adaptability to reconvert the velocity of whirl into pressure head it may be advantageous in many cases to give a greater whirl to the auxiliary discharge than the normal whirl of the discharge from the runner.

The construction provided by this invention compactly encloses the auxiliary gate and its operating means within the natural boundaries of the turbine parts. The source of pressure for the auxiliary gate may either be the pressure in the turbine intake or penstock, or pressure from the governor pumping system. In order to insure the operation of the gate under all conditions even when the gate has remained stationary for long periods of time, and may tend to stick in one position and offer a considerable resistance to movement, a large piston area may readily be provided in the gate piston flange 21 without requiring an inconvenient width for the flange. When pressure from the governor pumping system is used to operate the gate, no difficulty is introduced by the use of a large piston area since there is no need for imposing a large and sudden demand for motive fluid and at the infrequent times when the gate of the head increaser has to be operated it can be moved slowly, and under ordinary conditions of operation will remain in its new position for a considerable time without requiring further change in position. This is due to the fact that, in general, changes of water level at a plant do not take place rapidly.

Another advantage of the device of this invention is the provision of a restoring mechanism connecting the gate with the control valves by means of which the gate may be automatically maintained in any position corresponding to the setting of the hand wheel. The hand wheel or control 40 may be located at any convenient position in the plant suitable for connection with the gate restoring mechanism. The pressure and exhaust piping, 25, 26 connecting with the spaces on either side of the piston flange of the gate can be of small or moderate size, since the gate motion need not be rapid, as just explained, and it is only necessary to insure that fluid may enter and leave the cylinder spaces in sufficient quantities to overcome the effects of leakage around the piston flange.

The continuous columnar support provided by the vane rings 11 and 8 sustains the turbine structure from the foundation and surrounds and houses the movable guide vanes 9 and the gate G and these parts are removable. The ring 14 may be lifted out after the turbine runner and head cover and the movable guide vanes have been taken out and this leaves an unobstructed space for the removal of the rings 14 and $d'$ and gate G up through speed vane ring 8, thereby rendering easy the dismantling and replacement of the movable parts of the head increaser.

The use of fluid pressure means for operating the gate of this device permits the design of the gate and passages to be made compact, so that the point where the bypass passages enter the draft tube can be placed close to the runner, where the velocity in the draft tube is a maximum, thus increasing the effectiveness of the device.

The provision of a vane-free space between the guide vanes of the bypass and the point of discharge into the draft tube furnishes a transition space in which under some conditions of operation the auxiliary flow can gradually change its whirl to adapt its velocity to that in the draft tube.

I claim:—

1. In a hydraulic turbine the combination with an intake and draft tube and a turbine runner between said intake and tube, of a by-pass from said intake to said draft tube below said runner, an axially movable gate for said by-pass, and operating means for said gate contained within the annular space bounded by the inner wall of the intake, the upper wall of said by-pass and the axially directed portion of the turbine conduit at the upper end of the draft tube.

2. In a hydraulic turbine the combination with an intake and draft tube and turbine runner between said intake and tube, of a by-pass from said intake to said draft tube below said runner, a gate for said by-pass, and fluid pressure operating means for said gate contained within the annular space bounded by the inner wall of said intake, the upper wall of said by-pass and the axially directed portion of the turbine conduit at the upper end of the draft tube.

3. In a hydraulic turbine the combination with a runner, of a speed ring in the intake to said runner, a draft tube, a by-pass between said intake and said draft tube, a gate for said by-pass, and fluid pressure operating means for said gate contained within the annular space bounded by the inner wall of said intake, the upper wall of said by-pass and the axially directed portion of the turbine conduit at the upper end of the draft tube, said operating means being removable through said speed ring.

4. In a hydraulic turbine the combination with a runner of an intake passage and draft tube therefor, a by-pass between said intake and draft tube and control means for said by-pass comprising a gate having a piston portion and means for applying fluid pressure to said piston to operate said gate.

5. A hydraulic turbine having a speed ring, a draft tube, a casing supporting said speed ring and having a by-passage for flow to increase the head on said turbine, and a gate and fluid pressure operating means therefor in said casing.

6. A hydraulic turbine having a speed ring, a draft tube, a casing supporting said speed ring, and having a by-passage for flow to increase the head on said turbine, and a gate and fluid pressure operating means therefor in said casing, the inner wall of said casing being continuous with and forming a part of said draft tube.

7. In a hydraulic turbine the combination with an intake passage and a draft tube, of a casing between said passage and said draft tube, and having a by-passage for flow to increase the head on said turbine, and a gate and fluid pressure operating means therefor in said casing.

8. In a hydraulic turbine the combination with an intake passage and a draft tube, of a casing between said passage and said draft tube, and having a by-passage for flow to increase the head on said turbine, and a gate having a piston and fluid pressure operating means therefor in said casing.

9. A hydraulic turbine comprising a runner and having as an integral part of its support a casing having a passage to by-pass the water into the draft tube beneath said runner, a gate for regulating the flow through said passage, and fluid pressure controlled means in said casing for moving said gate.

10. A hydraulic turbine having a speed ring, a draft tube and a casing having a by passage for flow to increase the head on the turbine discharging into said draft tube and vanes forming substantially vertical columns with the vanes of said speed ring, a gate controlling the flow through said head increaser and fluid pressure controlled means in said casing for moving said gate.

11. A hydraulic turbine having a speed ring, a casing having auxiliary passages beneath said speed ring, and a gate regulating the flow through said passages and having a piston moving in an annular cylinder in said casing.

12. A hydraulic turbine having a speed ring, a casing having auxiliary passages beneath said speed ring, and a gate regulating the flow through said passages and having a piston moving in an annular cylinder in said casing, said gate having a diameter less than the opening through the speed ring so as to be withdrawable therethrough.

13. A hydraulic turbine having an intake, a speed ring, a runner, a draft tube, a by-pass from said intake opening into said tube in close proximity to said runner, stay vanes in said bypass below said speed ring serving as a support therefor, and a vane-free transition space in said bypass between the stay vanes and the draft tube.

14. In a hydraulic turbine the combination with a runner of an intake passage and draft tube therefor, a bypass between said intake and draft tube, and control means for said bypass comprising a gate having a piston portion and means for applying fluid pressure to said piston to operate said gate, means for controlling said fluid pressure, and a restoring mechanism between said gate and said means.

15. In a hydraulic turbine the combination with an intake and runner, of a draft tube having a spreading portion between inner and outer concentric surfaces of revolution forming between them a passage completely annular in form at all points between said surfaces of revolution and flaring outwardly to gradually turn and decelerate the flow and recover the energy of both the axial and whirling components of velocity, and a by-pass adapted to discharge water directly from said intake into the draft tube in directions having tangential components about the turbine axis.

HARVEY BIRCHARD TAYLOR.